United States Patent [19]

Otani et al.

[11] 4,016,247
[45] Apr. 5, 1977

[54] PRODUCTION OF CARBON SHAPED ARTICLES HAVING HIGH ANISOTROPY

[75] Inventors: Sugio Otani, Kiryu; Shoji Watanabe, Niigata; Tadashi Araki, Tokyo, all of Japan

[73] Assignees: Kureha Kagaku Kogyo Kabushiki Kaisha, Tokyo; Toyo Boseki Kabushiki Kaisha, Osaka, both of Japan

[22] Filed: Apr. 3, 1975

[21] Appl. No.: 564,895

Related U.S. Application Data

[63] Continuation-in-part of Ser. No. 20,050, March 16, 1970, abandoned.

[30] Foreign Application Priority Data

Mar. 31, 1969 Japan .............................. 44-24161

[52] U.S. Cl. ...................... 423/447.4; 423/447.6; 423/448; 423/449; 264/29.1; 264/29.2
[51] Int. Cl.² ................ C01B 31/02; C01B 31/04; C01B 31/07
[58] Field of Search .......... 423/445, 447, 448, 449; 264/29

[56] References Cited

UNITED STATES PATENTS

| | | | |
|---|---|---|---|
| 2,915,370 | 12/1959 | Mitchell | 423/448 |
| 3,392,216 | 7/1968 | Otani | 423/447 X |
| 3,558,276 | 1/1971 | Otani | 423/447 |
| 3,565,980 | 2/1971 | Otani | 264/29 |
| 3,629,379 | 10/1971 | Otani | 423/447 |
| R27,794 | 10/1973 | Otani et al. | 423/447 X |

FOREIGN PATENTS OR APPLICATIONS 1,151,248  7/1963  Germany .......................... 423/448

OTHER PUBLICATIONS

Jurkiewica et al., "Coal Tar Compounds," 1962, pp. 102-121 and 137-140.

*Primary Examiner*—Edward J. Meros
*Attorney, Agent, or Firm*—Wenderoth, Lind & Ponack

[57] ABSTRACT

In the production of carbon shaped articles such as fibers, films, etc. having high molecular orientation, anisotropy, strength, and modulus of elasticity through the steps of forming raw material pitch into desired shapes, infusibilization of the same followed by carbonization optionally graphitization, a raw material pitch having particular physical properties such as melt viscosity of 0.4 to 700 poises at a temperature range of 320° to 480° C, eminent structural anisotropy, and fluidity is used to produce such desired shaped product.

3 Claims, No Drawings

PRODUCTION OF CARBON SHAPED ARTICLES HAVING HIGH ANISOTROPY

CROSS-REFERENCE TO A RELATED APPLICATION

This application is a continuation-in-part application of the previous application No. 20,050, filed Mar. 16, 1970 for "Production of Carbon Shaped Articles Having High Anisotropy" now abandoned.

BACKGROUND OF THE INVENTION a. Field of the Invention

This invention relates to an improved method of producing carbonaceous or graphitic articles in fibrous or film form having high anisotropy by selecting a substance having particular chemical structure and properties as a carbon precursor. (The carbonaceous or graphitic shaped articles will hereinafter be called in general term "carbon shaped articles".)

b. Discussion of Prior Arts

There have been known several methods of producing carbon shaped articles, particularly carbon fibers, representative methods of which are as follows:

1. A method, in which the fibers made of natural of synthetic high polymer materials such as polyacrylonitrile, polybenzimidasole, cellulose, etc. are baked.

2. A method, in which pitch as a raw material is formed into a fibrous shape by melt-spinning, thereafter subjecting the fibers to infusibilization treatment and then to carbonization.

The abovementioned second method has been invented by one of the present inventors, and is suited for obtaining products of uniform quality and high strength, as taught in U.S. Pat. No. Re. 27,794 (Otani) and No. 3,629,379 (Otani).

The characteristic feature of producing the carbon fibers from pitch as taught in the abovementioned patents is such that natural or synthetic organic compounds are baked at a temperature of from 300° to 500° C (heat-treatment in an inert gas atmosphere) to obtain a pitch substance in a molten state, then the molten pitch substance is subjected to melt-spinning, and the thus spun filaments are oxidized to infusibilize so that the individual filament may not be fused together by further heat-treatment, after which the infusibilized filaments are subjected to carbonization. In this case, the melt-spinning is carried out by using the raw material pitch of a particular class having mean molecular weight of 400 and above. The thus spun filaments are then subjected to the infusibilization treatment and carbonization, followed by, if necessary, the graphitization treatment, thereby obtaining the carbonaceous or graphitic fibers.

However, no precise study has ever been made as to the molecular orientation of the carbonaceous or graphitic fibers obtained by the patented methods, and the relationship between the crystal growth and the physical properties or structure of the raw material pitch as well.

The present inventors have connected further studies and experiments on the abovementioned problems, and have finally found out that carbonaceous or graphitic shaped articles having high modulus of elasticity and excellent crystal orientation, particularly high anisotropy, can be obtained by the use of carbon precursors with particularly orientable molecular class as the principal constituent.

The present invention is directed to a more limited definition of the pitch in its physical properties to suit the purpose of obtaining carbon shaped articles having the modulus of elasticity of 1,400 tons/cm$^2$ and above, which is at the present moment made the object of practical use as the carbonaceous or graphitic fibers for reinforcement purpose. This value of the modulus of elasticity is twice or more as high as that of carbon fibers obtained heretofore with usual pitch as the raw material.

SUMMARY OF THE INVENTION

It is therefore an object of the present invention to provide a method for producing carbon shaped articles having high anisotropy and high modulus of elasticity from raw material pitch.

It is another object of the present invention to provide a method for obtaining the abovementioned pitch suited for the raw material to produce carbon fibers having such excellent properties.

The foregoing objects, other objects as well as the principle of the present invention will become more apparent from the following detailed description of the invention together with preferred embodiments thereof.

DETAILED DESCRIPTION OF THE INVENTION

For the purpose of the present invention, the term "anisotropy" is meant by the optical anisotropy, and the term "anisotropy of the raw material pitch" is meant by the anisotropic portions to be recognizable from observation through a polarization microscope on the polished surface of the raw material pitch in its cross-section, which has been cooled to solidify from its molten state having a melt-viscosity thereof of lower than 700 poises. Also, the term "anisotropy of the carbon shaped body" is meant by the orientation in the axial direction bo be recognized from observation through the polarization microscope on the polished surface of the carbon shaped body in its cross-section, which is parallel to the axial direction of such carbon shaped article, and the orientation in the axial direction of the planar molecules by the X-ray analyses.

The most suitable raw material pitch to obtain the carbon shaped body according to the present invention has the carbon content in the range of from 95 to 96.5% by weight, a mean molecular weight of more than 400, and is capable of assuming a uniform molten state at a temperature range of from 320 to 480° C, and showing the melt viscosity of higher than 0.4 poise but not exceeding 700 poises, and is anisotropic to the extent that an isotropic portion thereof can hardly be recognized with a polarization microscope examination on a polished surface thereof.

Such raw material pitch of high anisotropy is obtained by subjecting organic compounds of highly aromatic structure as the principal constituent to heat treatment or chemical treatments.

In the following, detailed explanations will be given as to the method of obtaining the pitch exhibiting such high anisotropy.

Generally speaking, according to the present inventors, it has been found out that the abovementioned pitch of high anisotropy can be obtained by subjecting an organic substance to heat-treatment under specific conditions which vary with the chemical composition of the organic substance. For example, when the organic substance is a highly condensed polycyclic compound having seven rings or more and having large flatness in the molecular structure as a main component, it is heated at a temperation of 380° to 600° C for 30 to 600 minutes, preferably at a temperature of 450° to 600° C for 30 to 90 minutes, in a non-oxidizing atmosphere. On the other hand, when the organic substance is a condensed polycyclic compound having less than seven rings as a main component, it is heattreated with two steps, namely it is heated to 300° to 500° C as is described in U.S. Pat. No. Re 27794 as the first step and then heated to 380° to 450° C for 60 – 300 minutes as the second step, the both steps being carried out in a non-oxidizing atmosphere. These condensed polycyclic compounds are not necessarily pure products, but they may be a mixture of two or more such compounds, or those such as pitches.

In practice, when a compound containing therein, as the basic compound and skeleton, a condensed polycyclic structure having not less than seven rings, and, in some cases, substituent groups such as methyl group, amino group, and so forth in certain numbers, and quinone-type oxygen as well is heated to a temperature immediately before coking, the compound generally exhibits a state, in which the molecular structures become planar and parallel each other due to the condensed polycyclic structures of the compound and the polycondensation having taken place among the condensed polycyclic structures.

According to the present inventors, 1,2,3,4,5,6,7,8-tetrabenzanthracene belonging to this kind of condensed polycyclic compounds posess the melting point of 428° C and can be made a spinnable anisotropic pitch substance by the heat-treatment at a temperature range of from 460° C to 470° C. Also, other substances such as phenanthrene, crysene, pyrene, coronene, perylene, benzoperylene, or a mixture thereof have been found to be converted to the pitch substances showing low viscosity by subjecting the same to the two-step heat-treatment. In this case, addition to the mixture compounds of the Lewis acid catalyst such as $AlCl_3$, $FeCl_3$, and so on, which is capable of forming $\pi$-type complex compound with such compounds, would, in some occasion, effectively function even at a temperature of lower than 300° C at the first step and then at a temperature of 380° to 450° C at the second step.

Also, black pitch obtained by heating a polycyclic compound such as dibenzo-triptycene (hereinafter abbreviated as "DBT") having high aromaticity, but not having the planar molecular structure, at a temperature of 350° C for 3 hours in a nitrogen atmosphere, thereafter, further heating the same to a temperature of 450° C for 1 hour has also been clearly observed to have anisotropy under a polarization microscope.

95.2%, hence the pitch is sufficiently useful as the raw material pitch for the purpose of the present invention.

Further, the substance having fluidity even at a temperature of 400° C and above obtained by subjecting resinous pitch or tar obtained by heat-treating crude petroleum oil or its tractionated components at a temperature of from 700° C to 2,000° C for a cracking time of from 1/1,000 to 1/10 second to heating at a temperature of 250 to 550° C for 1 to 300 minutes and distilling off rather volatile matters during the heating, and then by subjecting the material to the second heating at a temperature of 380° to 450° C for 60 to 300 minutes in which a procedure of removing fine solid particles by filtration is included, has also been verified to be the anisotropic pitch.

In the case of heating tetrabenzo (a,c,h,j)-phenazine, a pitch which is mixture of the dimer and the trimer is produced. Yet, the pitch has sufficient fusibility and melt-viscosity that enable shaping of the articles, and has been observed to have anisotropy under a polarization microscope. Examples of such substance can be recognized in some sorts of dyestuff such as "Threne Yellow 3RT", "Threne Gold Orange 3G", "Indanthrene Brown BR", and "Threne Red RK", all of which are the manufacture of Mitsui Kagaku Kabushiki Kaisha, Japan, and can be identified by the principal constituent of:

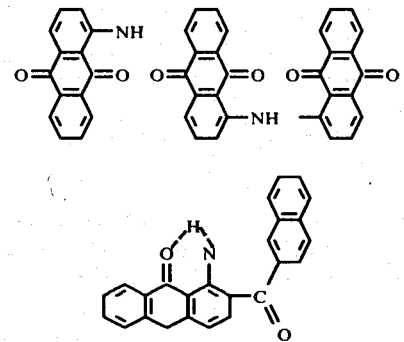

When any one or a mixture of the afore-described anisotropic pitch substances is used for shaping carbon articles, those which have been cooled to solidify from its molten state with the melt viscosity of less than 700 poises scarcely show isotropic portion, when observed by a polarization microscope. Further, when these substances are shaped, for instance, into fibers, and then the fibers are observed through the polarization microscope and X-ray diffraction along the polished surface of the fibers in parallel with the axial direction of the

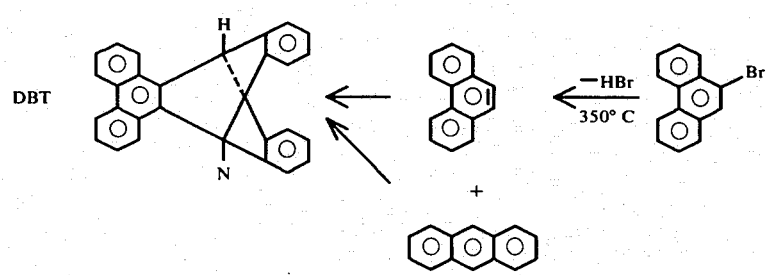

The pitch exhibited a viscosity of 30 poises at the elevated temperature of 480° C, had the carbon content of fibers, there can be recognized orientation of the planar molecules in the axial direction of the fibers. When the substance is shaped into a film, the same orientation can also be recognized on the polished surface along the plane.

The fibers made from aforementioned anisotropic pitch, when subjected to carbonization or graphitization, whether or not they are infusibilized, have been verified by X-ray observation to have orientation as high as that of the so-called high modulus carbon fibers which were subjected to the orientation-elongation at a graphitization stage.

The modulus of elasticity of the shaped articles from these substances is also improved in comparison with the shaped articles obtained from the conventional pitch material. That is, with the substances of the present invention, the carbon shaped articles having the Young's modulus of more than 1,400 tons/cm$^2$ are found producible. It is now clear that extremely unique effect can be obtained by the use of this kind of pitch exhibiting the anisotropy.

In summary of the foregoing explanations, there can be present carbon precursors having stable fluidity with the viscosity of from 0.4 to 700 poises at a temperature below the thermal decomposition temperature as seen in a few instances as already stated in the foregoing, and, at the same time, exhibiting anisotropy, which can be recognized by observation through the polarization microscope after cooling of the substance. Use of such substances as the raw material is the fundamental concept of the present invention. Such raw material is shaped into fibers or film by the ordinary methods. When manufacturing the carbon fibers, melt-spinning method is advantageous, and other methods such as extrusion, compression, centrifugal method, spray, and the like methods can all be used effectively. In the case of the film forming, the casting process which is generally practiced is employed.

The infusibilization treatment after shaping as is the case with the pitch fibers is carried out in an oxidizing atmosphere such as ozone, oxygen, oxides of nitrogen, halogens, and sulfur trioxides ($SO_3$), or an atmosphere containing therein one or more kinds of these gases, or in sulfur vapor. Contact-treatment of the pitch fibers after the oxidation treatment with ammonia gas not only accelerates the infusibilization, but also improves the carbonization yield and the mechanical strength of the resulting carbon fibers. It is also recognized that, by this treatment, the molecular orientation of the fibers at the temperature of from 700° to 1,500° C, for example, or at the stage of carbonaceous structure from the crystallographic standpoint, is strengthened. Such strengthening effect can also be clearly recognized at the stage of the heat-treatment higher than 1,500° C, wherein the impairment in the crystallinity and molecular orientation of the shaped products subjected to the oxidation-treatment alone can be safeguarded by this ammonia treatment. Since the raw material used in the present invention is generally of a high softening point and large heat stability, the infusibilization treatment can be done under a stronger conditions than in the case of the conventional pitch fibers. It is generally practiced within a few hours at a temperature between a normal temperature and a temperature at which the object to be treated causes no softening and deforming. The shaped body which has completed the infusibilization is calcined in a non-oxidizing atmosphere to be carbonized or graphitized.

The raw material of the present invention, as has been described in the foregoing, not only is desirable for manufacturing carbon fibers of high anisotropy and improved modulus of elasticity, but also enables production of carbonaceous or graphitic films having high flexibility. When films are formed from the heretofore known isotropic pitch material and subjected to carbonization or graphitization treatment, only carbonaceous film similar to thin glass film and having poor flexibility could only be obtained. However, according to the present invention, highly flexible carbonaceous or graphitic films could be produced by thinly pouring the abovementioned raw material in molten state onto a polished surface of a metal plate, silica plate, and silicon or ceramic plate, and then calcining the same under heat in a non-oxidizing atmosphere without applying any tension thereto. In this case, the infusibilization treatment prior to the calcination in the non-oxidizing atmosphere is not always necessary. The reasons for this is that the shaped body is held on the substrate and is protected from deformation or fusion due to heating. High flexibility of the film thus obtained is due to the fact that the planes of the condensed rings of the substance orientate along the plane direction at the time of film forming, the basic structure thereof is succeeded by carbonaceous or graphitic films after the calcination.

PREFERRED EMBODIMENTS

In order to enable those skilled in the art to reduce the present invention into practice, the following actual examples are presented. It should, however, be noted that these examples are merely illustrative, and that changes and modifications may be made within the spirit and scope of the present invention as set forth in the appended claims.

EXAMPLE 1

1 g of phenanthrene was added to 10 g of crysene, and the mixture was sealed in an glass ampoule under a nitrogen atmosphere and was placed in an autoclave. The autoclave was held in an electric furnace for 3 hours which temperature had been maintained at 500 at 530° C, so as to keep the mixture at a temperature of around 480° C for 75 to 90 minutes. The resulting mixture was filtered with stainless steel net at a temperature of 420° C and the filterate was further kept at the same temperature for 90 minutes, both procedures being conducted under a nitrogen atmosphere. The total time for keeping the mixture at 420° C was around 2 hours. This substance, when observed its polished surface after cooling through a polarization microscope, showed orientation to such an extent that isotropic portion could hardly be recognized. As the result of the elementary analyses, ultra-violet ray spectrum, infrared ray spectrum, and X-ray analyses, it was verified to be a pitch having condensed polycyclic aromatic structure containing 10 to 11 aromatic rings. The pitch also indicated its carbon content of 96.5%, means molecular weight of 450, viscosity of 100 poises at 350° C, and high anisotropy.

This substance was melt-spun at 350° C through nozzles of 0.5 mm in diameter in accordance with the extrusion spinning method, whereby fibers of about 17 microns in diameter were formed. By the abovementioned observation methods, the fibers were verified to have high molecular orientation in the axial direction of the fibers. The fibers thus formed were made about 50 cm long and hung within a heating furnace without applying any external load thereto for the oxidation treatment in air containing 10% by volume of NO₂ at a temperature of 150 to 200° C for 5 hours, and subsequently in air alone of an elevated temperature of 300° C for 2 hours, thereby to infusibilize the fibers. Next, when the article was heat-treated in a nitrogen atmosphere first to a temperature of 1,000° C at the rise rate of 5° C/min., and then to a temperature of 2,800° C at the rise rate of 10°-20° C/min., there was finally obtained graphite fibers which exhibited as the result of the X-ray observation molecular orientation to such an extent that 80% of the plane of the condensed rings within the range of ± 10° from the axial direction of the fibers. The carbonization yield of the fibers after the above heat-treatment was 95%, which was found to be a value higher by 80 by 90% than in the case of carbon fibers obtained from the ordinary pitch containing as its principal constituent the condensed polycyclic structure of about 3 to 5 rings.

The modulus of elasticity of the fibers was approximately 2,200 tons/cm². In contrast thereto, the pitch fibers formed from ordinary pitch material in the same manner exhibited no orientation as the result of observation through a polarization microscope, and the elasticity modulus of the finally obtained graphite fibers was only approximately 450 tons/cm².

EXAMPLE 2

5 g. of phenanthrene and 1 g. of aluminum chloride (AlCl₃) were added to 20 g. of benzopyrene, and the mixture was heated at 250° C to 270° C for 3 hours in an autoclave of nitrogen atmosphere, thereafter the batch was washed with hydrochloric acid and then rinsed with water to remove AlCl₃, and the resulting pitch was then heated at 400° to 420° C for 3 hours, whereby a pitch substance exhibiting a uniform molten state of 340° C to 350° C and the melt viscosity of approximately 150 poises was obtained. This pitch was found to have the carbon content of 96.0% and the molecular weight of 480. This pitch substance, when observed its polished surface after cooling through a polarization microscope, showed orientation to such an extent that isotropic portion could hardly be recognized. As the result of the elementary analyses, ultraviolet ray spectrum, infrared ray spectrum, and X-ray analyses, it was found to be a pitch having the condensed polycyclic structure of 9 to 12 rings in average and compounds in which average two units of the abovementioned condensed polycyclic structure were linked together with a single number of bridge.

This substance was melt-spun in the same manner as in Example 1 above to form fibers of about 19 microns in diameter. The fibrous article was verified to have high molecular orientation in the axial direction of the fiber. The fibers were subjected to infusibilization treatment in the same manner as in Example 1, thereafter they were heat-treated at 2,800° C to graphitize. The graphite fibers thus obtained exhibited molecular orientation to such an extent that about 83% of the plane of the condensed rings within ± 10° from the axial direction of the fibers. The carbonization yield of the fiber was 96% and its elasticity modulus was approximately 2,300 tons/cm².

EXAMPLE 3

A pitch obtained by removing distillable components at 380° C/10 mm Hg or below by the distillation under reduced pressure of a tar substance produced by thermal cracking of crude petroleum oil (Seria origin) at 1,800° C for 4/1,000 second was melted to eliminate fine particles of non-melting components therein at 410° C, whereby pitch substance showing a uniform molten state at 350° C to 420° C and the melt-viscosity of about 350 poises. The pitch indicated the desired anisotropy, and had the carbon content of 96.5% and the mean molecular weight of 650. According to observation through a polarization microscope, this pitch was found to have perfect orientation, and, as the result of the elementary anaylses, X-ray analyses, infrared ray spectrum, and other measurements, it was further found to be an aromatic hydrocarbon compound containing 2.7% sulfur, in which two units of condensed polycyclic structure containing 7 to 9 rings are linked together by a single number of bridge, and less than one in average of methyl group along is contained in the unit structure.

This pitch was melt-spun at 400° C to 420° by using a rotary cylindrical spinning machine of 100 mm dia., 20 mm deep, and having 30 tiny holes of 0.3 mm each, at a rotational speed of about 800 rpm, whereby pitch fibers of about 15 microns in diameter was obtained. This pitch fiber was also recognized to have high molecular orientation in the axial direction through the polarization microscope. The X-ray observation also revealed high orientation. The carbonization yield of the fiber after the infusibilization and carbonization was 92% and its elasticity modulus was measured at 2,800 tons/cm². The degree of orientation due to the X-ray analyses was 85% with $L_c$ 600A, $L_a$ 1,000A, and $d_{002}$ 3.368A, measured by Gakushin method.

EXAMPLE 4

By heat-treating the crystals of tetrabenzo(a,c,h,j)-phenazine having the melting point of 485° C at 580° C to 590° C for 1 hour, a glossy, black substance was obtained. This substance showed the melting temperature of 300° C to 310° C, and the melt thereof exhibited good fluidity, the viscosity of which at 350° C was approximately 50 poises. The carbon content of this substance was 96.0%, and its mean molecular weight was 410. The polished surface of the substance after cooling, when observed through a polarization microscope, indicated high orientation to such an extent that not a trace of isotropic portion could be recognized therein. As the result of the elementary analyses, ultra-violet ray spectrum, infrared ray spectrum, and molecular weight measurement, it was verified that the substance was a new kind of high aromatic compound of the following formula.

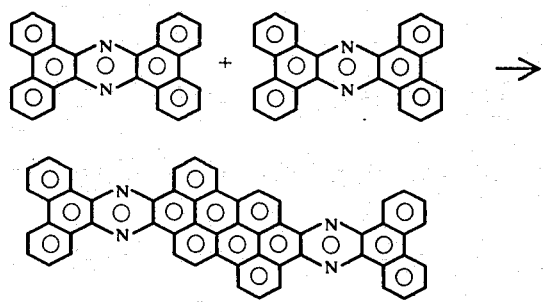

This substance was melt-spun at 350° C to 370° C in the same manner as in Example 2, whereby long fibers of about 15 microns in diameter was obtained. Further, when the fibers were subjected to the infusibilization, carbonization and graphitization same as in Examples 1 and 2, high molecular orientation could be observed by X-ray. Also, the modulus of elasticity was as high as 3,200 tons/cm$^2$.

This substance was also cast on a clean silica disc of 30 mm in diameter to form a thin film of 5 to 15 microns. The film was also recognized by the polarization microscope to have perfect anisotropy in the direction of the place as is the case with the fibers. When this film was heat-treated in an argon gas atmosphere upto a temperature of 1,000° C at the rise rate of 1° to 2° C/min., and then upto a temperature of 2,800° C at the rise rate of 5 to 20° C/min., it turned into a highly flexible film. The carbonization yield at that time was 91%.

When the film was measured by X-ray, it was verified that the distance between the strata was 3.370 A, the length of the ab planes was 350 A, and the lapping in the direction of the C axis was 330 A. In comparison with the film obtained from the ordinary pitch, the values of which are respectively 3.385 A, 180 to 200 A, and 140 to 160 A, measured by Gakushin method, the film of the present invention possesses high orientation.

What is claimed is:

1. In a method for producing carbon shaped articles having high molecular orientation, anisotropy, and modulus of elasticity from pitch as the raw material through the process steps of forming the pitch into the required shape, subjecting the same to infusibilization, carbonization, and optionally graphitization treatments, the improvement which comprises:
   forming said raw material pitch having specific properties of the carbon content in the range of from 95 to 96.5% by weight, a mean molecular weight of from 400 to 2,000, melt viscosity of from 0.4 to 700 poises at a temperature range of from 320° C to 480° C, said pitch possessing an anisotropic structure and excellent fluidity; and then carrying out said process steps of the infusibilization, carbonization, and optionally graphitization of said shaped articles, in sequence, without applying any tension whatsoever thereto during said treatments, said raw material pitch being obtained by subjecting tetrabenzophenazine to heat treatment at a temperature of from 450° to 600° C for 30 to 90 minutes.

2. A method as claimed in claim 1, in which said heat treatment of tetrabenzophenazine is effected at a temperature of from 580 to 590° C.

3. A method according to claim 1, in which the raw material pitch is obtained by subjecting the crystals of tetrabenzo (a,c,h,j)-phenazine having a melting point of 485° C to heat treatment at 580° C to 590° C for 1 hour.

* * * * *